United States Patent Office 2,799,669
Patented July 16, 1957

2,799,669

POLYMERS OF VINYL ALKYL ETHERS

Abraham O. Zoss, Berkeley Heights, N. J., assignor to General Aniline & Film Corporation, New York, N. Y., a corporation of Delaware No Drawing. Application September 8, 1950,
Serial No. 183,919

5 Claims. (Cl. 260—91.1)

This invention relates to resilient rubber-like polymers of vinyl alkyl ethers.

This application is a continuation-in-part of my prior applications Serial No. 587,838 and Serial No. 587,839, filed April 11, 1945, and Serial No. 681,129, filed July 2, 1946.

Polymerization of vinyl ethers by means of acid-reacting catalysts has been described heretofore, for example, in U. S. P. 2,061,934, U. S. P. 2,098,108, U. S. P. 2,104,000, U. S. P. 2,104,001, U. S. P. 2,104,002 and U. S. P. 2,188,778, French Patent 734,129, Chalmers "Canadian Journal of Research," vol. VII (1932), pages 472–480, and Shostakovskii et al. "Chemical Abstracts" 37 (1943), page 2486.

It is one of the major aims of workers in the polymerization field to produce high molecular products which are form-stable. By form-stable, I mean products which, under ordinary conditions, retain their shape on standing and do not flow to take the form of the vessel in which they are confined. The reason for the desire to obtain the form-stable polymers is due to the fact that such polymers may be put to applications for which the non-form-stable products are unsuitable. They may, for example, be used in the molding, pressure-casting and extrusion art. They may be rolled out into thin sheets for use in lamination work or for use as wrapper films, container coatings and the like. They may also be used as electrical and heat insulators depending upon the electrical characteristics and softening point thereof. They may also be employed in many cases as rubber substitutes. Operators in the polymerization field therefore do not consider that the polymerization of a class of monomers has been sufficiently developed unless methods have been devised by which the monomers may be polymerized to the normally solid or form-stable products.

Practically all of the work which has been done in connection with the polymerization of vinyl ethers, excepting vinyl isobutyl ether, has led to the formation of viscous, sticky, honey-like masses. It appears to have been the impression of the workers in this field that the vinyl ethers could only be effectively polymerized by causing the reaction to take place at such a violent rate that the reaction is completed immediately after contact with the monomer of the usually employed acid-reacting catalyst. As a consequence, the prior art when polymerizing monomers other than the vinyl isobutyl ether utilize temperatures ranging upwards from about $-10°$ C. and preferably within the range of 40 to 60° C., thereby obtaining only viscous, liquid-to-soft-solid products. For instance, U. S. P. 2,104,000 states that the temperatures to be employed for the polymerization of vinyl ethers should be generally from 10 to 120° C. and preferably between 20 and 100° C. It points out that where polymerization is effected by the utilization of a boron halide addition product, a temperature of between 40 and 60° C. is to be recommended. One need only refer to the examples of this patent—for instance, to Example 1, to observe that by operating in the manner proposed, the products which are obtained are not form-stable but, on the contrary, are viscous liquid products.

Vinyl isopropyl ether polymerizes under the usual conditions of polymerization with explosive violence, yielding only the sticky, viscous products of the prior art. This is true even working at reduced temperatures, i. e., below $-10°$ C., since reduction of temperature alone fails to abate the explosive nature of the reaction.

Vinyl n-butyl ether was polymerized according to the prior art, utilizing temperatures ranging upward from about $-10°$ C., and preferably within the range of 40 to 60° C. By these methods, the polymer obtained is in every case a viscous, sticky, honey-like mass.

Vinyl methyl ether, polymerized by the process of U. S. P. 2,104,000, at a temperature of about 10° C. and above, is neither a crystalline nor form-stable rubberlike polymer, but ranges from liquid to semi-solid, lacking the physical properties of a substitute for rubber.

I have found that vinyl ethers can be polymerized to rubberlike, form-stable polymers which are tough, resilient and generally non-tacky solids, and which, as distinguished from the products heretofore known, exhibit microcrystalline structure in that they yield X-ray fiber diagrams in stretched condition.

Alkyl vinyl ethers yielding such polymers are especially the lower alkyl vinyl ethers—namely, methyl vinyl ether, ethyl vinyl ether, propyl vinyl ether, isopropyl vinyl ether, butyl vinyl ether, isobutyl vinyl ether, and secondary and tertiary butyl vinyl ethers.

It is an object of this invention to provide polymers of the aforesaid vinyl ethers, having the aforesaid novel properties.

In general, such products are obtained by carrying out the polymerization in an appropriate solvent, such as a liquefied normally gaseous aliphatic hydrocarbon, or a hydrogen-containing halogenated alkane, at temperatures below $-30°$ C. and generally above $-100°$ C., especially from $-40$ to $-80°$ C. and preferably between $-60$ and $-70°$ C., and admixing the polymerization catalyst and the monomer progressively at a slow rate, and in appropriate cases, with sufficient dilution, to insure a mild rate of reaction rather than a violent rate as employed in the prior art.

Catalysts employed for preparing the polymers of this invention are acid-reacting condensing agents such as tin tetrachloride, stannous chloride, aluminum chloride, gallium trichloride, ferric chloride, zinc chloride, boron trifluoride, sulfuric acid, hydrochloric acid, or sulfur dioxide. For best results, the use of boron trifluoride or its addition product with organic oxygen-bearing compounds such as ethers, more particularly, the addition products of the dialkyl ethers such as boron trifluoride diethyl ether and boron trifluoride dibutyl ether are recommended. Other ethers suitable for such addition products are dipropyl ether, diamyl ether and ethyl methyl ether. The catalysts are used in relatively small amounts, for instance, in the proportions referred to in U. S. P. 2,104,000, and generally between 0.001% and 10% by weight, or preferably 0.08 to 5%, by weight of the vinyl alkyl ether.

Dilution of the catalyst, if normally solid or liquid, may be effected by using a solvent or diluent miscible with the catalyst. If the catalyst is employed in the gaseous state, e. g. boron trifluoride, dilution can be effected by mixing with nitrogen. Liquid solvents or diluents for this purpose may be aliphatic hydrocarbons such as liquid ethylene or propane, or in the case of boron trifluoride ether complexes, the complex-forming ether. For example, for polymerizing vinyl isopropyl ether, a dilution of one part to ¼ to 4 parts of diluent is suitable.

Various methods may be employed to attain and maintion the necessary reaction temperature. Solid carbon dioxide, for instance, may be used to effect this result. Similarly, the desired low temperature may be secured by the use of liquid refrigerants such as liquefied ethylene, methyl chloride and the like, refrigeration being effected by circulation of the diluent or by evaporation of the diluent from the reaction mixture.

Solvents or diluents for the vinyl alkyl ethers include liquid hydrocarbons such as liquid ethane, propane, butane or ethylene. Hydrogen-containing halogenated alkanes which can be employed include methyl chloride, methylene chloride, chloroform, monochlorodifluoromethane, ethyl chloride, ethylene dichloride, ethylidene dichloride and the like. Other hydrogen-containing halogenated alkanes can be employed in the process of the invention, especially those having freezing points below −30° C. Particularly valuable results are obtained when hydrogen-containing chlorinated alkanes of one to two carbon atoms are used. The quantity of hydrogen-containing halogenated alkane employed as the diluent can be varied over a wide range. In general, higher yields of polymer are obtained when from 1 to 5 mols of hydrogen-containing halogenated alkane per mol of vinyl ether are employed. Larger amounts of diluent can be used but at a sacrifice in economy due to the cost of recovery of the diluent.

The hydrogen-containing halogenated alkane diluents may be used in admixture with other suitable diluents, for example, liquid or liquefiable hydrocarbons, e. g. ethane, propane, butane, toluene, m-xylene, saturated ethers, e. g., methyl ether, ethyl ether, butyl methyl ether, butyl ethyl ether and the like. The use of mixtures of diluents is particularly desirable when the hydrogen-containing halogenated alkane employed freezes at temperatures above that employed for the polymerization of the vinyl ether. Mixtures of diluents in which the polymer is insoluble can advantageously be used to effect the precipitation of the polymer as formed from the solution as illustrated in Example 2.

The reaction is carried out by adding the catalyst, cooled to the desired reaction temperature, to the monomer or its solution, both similarly cooled, or by adding the monomer, cooled to the reaction temperature, to the catalyst mixture, which is likewise so cooled. While cooling the catalyst facilitates the reaction, the temperature thereof should not be lowered to the reaction temperature if the catalyst solidifies at such temperature. In that event, cooling will be effected to the lowest point where the catalyst still remains in the liquid state. It can be readily ascertained, either from the critical tables or by simple experiments, to what extent the catalyst may be cooled without solidification thereof taking place.

While good results are obtained by operating as stated, I have found that the reaction is expedited from the standpoint of heat control and speed of the reaction and that products of a superior homogeneity are obtained if the catalyst and monomer be uniformly mixed at a temperature at which polymerization does not ensure and polymerization effected after mixing by subjecting the mixture to a higher temperature and within the limits stated above. It is known that catalytic reactions are best effected where steps are taken to insure the greatest possible amount of contact between the catalyst and the substances which are being subjected to the reaction. By uniformly premixing the catalyst and the monomer, such contact is produced.

The rate of reaction for each vinyl ether varies with the temperature and for each there is a temperature below which the rate of reaction is substantially zero when using an acid-reacting catalyst with an inert diluent. For vinyl n-butyl ether monomer, such temperature is below −100° C. and it can be obtained by utilizing liquid ethylene as the cooling medium. For the vinyl isopropyl ether monomer, such temperature is below −110° C., a temperature which can be obtained by employing liquid nitrogen, liquid methane or the like as the cooling medium. If desired, the catalyst can be added to the mixture of vinyl ether monomer and a hydrogen-containing halogenated alkane gradually and in small amounts with continuous stirring while maintaining the temperature above −70° C. By so controlling the conditions of the reaction, a smooth and even rate of reaction is obtained which is conducive to the maintenance of the necessary low reaction temperatures. The catalyst should be added dropwise to avoid local overheating and the danger of losing control of the reaction.

It is desirable to conduct the polymerization in the essential absence of oxygen, that is, in the atmosphere of an inert gas such as nitrogen or carbon dioxide, the latter being conveniently provided by the addition of solid carbon dioxide to the reaction mixture, followed by venting for removal of air.

Completion of the reaction may be determined by the absence of heating or discoloration in a sample of the reaction mixture to which a small portion of the catalyst has been added. Where the addition compounds or organic oxygen-bearing compounds with boron fluoride are used, it is recommended that they be drawn from such as have been distilled under vacuum and freshly made or stored under refrigeration as such measures insure greater retention of their catalytic activity.

When the reaction is complete, the catalyst is deactivated, a procedure which will hereinafter be referred to as "quenching," by a treatment which is preferably carried out at very low temperatures specifically within the limits at which the reaction has been effected. For effecting the quenching, use may be made of an alkali, such as ammonium hydroxide, sodium hydroxide, potassium hydroxide, an organic amine such as methylamine, dimethylamine, ethanolamine, diethanolamine, pyridine and the like, an alcohol such as methanol, ethanol, butanol, benzyl alcohol and the like, a carbonyl compound such as acetone, methyl ethyl ketone, formaldehyde, acetaldehyde and the like. Should it transpire that any of these quenching agents freezes at the quenching temperature, solidification of the same is avoided by employing with the quenching agent a small amount of an inert diluent such as pentane.

The inactivated catalyst and quenching agent may be removed by washing the solution of the polymer in its reaction solvent or in another solvent such as benzene at room temperature (about 20° C.) with water or with water rendered alkaline by the addition of a small amount of an alkali such as ammonia, sodium hydroxide, potassium hydroxide and the like. On the other hand, such agents may be removed by dissolving the dry polymer in a solvent therefor and precipitating the polymer from its solution with the aid of a substance in which the polymer is insoluble, such as ethanol, methanol and the like. By causing the quenching to take place at the stated low temperatures, it is insured that there will be no conversion of any residual monomer at a temperature at which the undesirable low molecular weight products are formed.

The vinyl ether employed in the polymerization may be that obtained from the reaction of acetylene and an alcohol. In such case it is necessary to free it from the residual alcohol and any aldehyde and other impurities by washing with water and then drying by allowing it to stand over sodium or powdered potassium hydroxide for about 24 hours and finally fractionally distilling it from the solid treating agent. One precise fractional distillation is generally sufficient.

The rubbery, form-stable polymer of vinyl methyl ether of my invention is soluble in aromatic hydrocarbons, chlorinated hydrocarbons, alcohols, ketones, ethers and esters, for example, in benzene, chlorobenzene, methanol, ethanol, acetone, dioxane ethyl ether, ethyl acetate, etc., and in water at temperatures below about 35° C.

The polyvinyl isopropyl ethers of the invention are spongy, elastic, tenacious solids, form-stable on storage, in contrast to previously prepared polyvinyl isopropyl ethers. They show substantially reversible extensibility similar to partially vulcanized rubber. They are thermoplastic materials soluble in aromatic hydrocarbons such as benzene and toluene, in ethers such as diethyl ether and the like, ketones such as methyl isobutyl ketone and the like, and chlorinated hydrocarbons such as methylene chloride, carbon tetrachloride and the like. They are insoluble in water and the lower molecular weight alcohols such as methanol, but are soluble in normally liquid higher molecular weight alcohols such as butanol, amyl alcohol, hexyl alcohol and the like.

The poyvinyl n-butyl ethers of the invention are likewise spongy, elastic and tenacious solids in contrast to polyvinyl n-butyl ethers obtained according to the prior art. They also show substantially reversible extensibility similar to partially vulcanized rubber. Although they are not sticky to the touch, they exhibit tack when brought into pressure contact with other surfaces. They are thermoplastic materials soluble in benzene, toluene, ethers, ketones, chlorinated hydrocarbons and the like. They are, however, insoluble in water and the lower alcohols, although soluble in the higher alcohols, such as butanol and the like.

In general, because of the peculiar characteristics of the products, they may be put to use in many different fields. For instance, they may be worked on a rubber mill for compounding purposes or cast from a solution thereof for laminating and coating purposes, and for the production of transparent sheets and foils. They may be extruded, pressure cast or molded. They may be used as adhesives, electrical insulators, heat insulators, paint binders, wrapping films, container coatings, and the like. Because of the many fields to which they are applicable, these new products fill a substantial void in the polymer art.

The invention is illustrated by the following examples, although it is to be understood that my invention is not limited thereto. Parts are by weight unless otherwise specified.

Example 1

A reactor fitted with a stirrer, thermometer, means for adding the catalyst and a vent, was cooled in a solid carbon dioxide-methanol bath and 20 parts of liquefied methyl vinyl ether and 80 parts of methylene chloride were added. To this mixture was added with stirring 0.2 part of boron fluoride diethyl ether complex while maintaining the mixture at −74° C. The temperature was then raised to and maintained at −70° C. for 1 hour during which time polymerization occurred. A precooled mixture of 40 parts of methanol and 5 parts of concentrated ammonium hydroxide was then added with stirring and the contents of the reactor allowed to come to room temperature. The insoluble inorganic products were then removed by filtration, the methylene chloride evaporated and polyvinyl methyl ether precipitated by the addition of water heated to above 35° C. After drying, an excellent yield of transparent, colorless, tough, resilient, rubbery, form-stable polymer was obtained. X-ray examination of the polymer gave a crystalline X-ray diffraction pattern in contrast to a non-crystalline X-ray diffraction pattern for methyl vinyl ether polymers prepared by the method of U. S. P. 2,104,000—2,104,002.

Similar results are obtained when methyl chloride and ethyl chloride are used as the diluent in place of methylene chloride.

Example 2

A reactor similar to that described in Example 1 was cooled by means of a bath containing a mixture of solid carbon dioxide and methanol. To this reactor were added 116 parts of liquefied methyl vinyl ether, 170 parts of methylene chloride and 294 parts of liquefied propane. During a period of 40 minutes, 4 parts of boron fluoride-diethyl ether complex were added to the stirred mixture at such a rate so as to maintain the temperature within the range of −65° to −60° C. The polymer precipitated as formed from the solution in the form of a white solid mass. When the polymerization was complete, a precooled mixture of 100 parts of methanol and 60 parts of concentrated ammonium hydroxide was added with stirring and the polymer separated. Essentially, a quantitative yield of non-sticky, chlorine free, form-stable, rubbery polyvinyl methyl ether was obtained.

Example 3

Using the procedure as described in Example 1, except that 80 parts of monochlorodifluoromethane were used in place of methylene chloride, a good yield of tough, resilient, non-tacky, form-stable, rubbery polyvinyl methyl ether was obtained.

If chlorodifluoromethane or carbon tetrachloride is used as the diluent under similar conditions, only a trace of low molecular weight, sticky polymer is obtained.

Example 4

A reactor similar to that described in Example 1 was cooled by means of a liquid nitrogen bath and 36 parts of vinyl ethyl ether, 43 parts of methylene chloride and 102 parts of liquefied propane were added. To this mixture was added slowly with stirring 0.25 part of boron fluoride-diethyl ether complex. The temperature of the mixture was then increased to −70° C. and maintained within the range of −70° to −65° C. for 1 hour. Ten parts of precooled concentrated ammonium hydroxide were then added with stirring and the solid phase separated and dried under vacuum. There was thus obtained a tough, granular, rubbery, form-stable vinyl ethyl ether polymer.

Example 5

750 parts by weight of liquefied propane and 150 parts by weight of vinyl isopropyl ether were added to 1100 parts by weight of powdered solid carbon dioxide confined in an air-tight apparatus. This mixture was stirred for about ½ hour to replace all the air by carbon dioxide. A cooling bath of solid carbon dioxide in ethanol was used to surround the reactor for the purpose of maintaining the desired reaction temperature, which is −78° C. Diethyl ether-boron fluoride boiling at 56° C. at 25 millimeters pressure and diluted with diethyl ether in the ratio of 2 parts of the catalyst to 1 part of the ether, was added dropwise at such a rate that the aforesaid temperature of −78° C. was not exceeded.

The catalyst was added until no monomer remained. This point may be determined by removing a liquid sample from the apparatus, allowing it to warm to evaporate the volatile solvent and adding a small amount of the catalyst to the sample. If no polymerization ensues, as shown by heat evolution and charring under these drastic conditions, it is concluded that the monomer has been completely polymerized.

Concentrated aqueous ammonia, cooled to the reaction temperature, was then added as a quenching agent. On warming to room temperature and drying, a tough, spongy, rubberlike product was obtained which consisted of uniform granules which were non-sticky and form-stable.

The intrinsic viscosity of the material was 20 (0.2% in benzene).

Example 6

The procedure was the same as in Example 5, except that the precipitated polymer was removed as formed, by periodic interruption of the catalyst addition and by dipping out the solid polymer. The cold polymer was washed with precooled ammonia hydroxide before warming and drying.

Example 7

The procedure was the same as in Example 5, excepting that the catalyst was precooled before addition to the monomer by passing the catalyst through a jacketed chamber cooled by a mixture of an alcohol and solid carbon dioxide.

Example 8

25 parts of powdered solid carbon dioxide, 50 parts of liquefied propane, and 10 parts of vinyl isopropyl ether were added to an open flask. A stream of gas containing 50% boron trifluoride in nitrogen was slowly passed into the reaction mixture while stirring the same. The temperature, which was originally —78° C., rose to —70° C. A solid, rubberlike material was precipitated. The catalyst was quenched with aqueous ammonia and the product was freed of volatile material, washed with methanol and dried.

Example 9

250 parts of liquefied butane and 50 parts of vinyl isopropyl ether were added to an open flask. This mixture was cooled to —78° C. by adding solid carbon dioxide to the mixture and by locating the flask in an external cooling bath of the same refrigerant. Precooled diethyl ether-boron fluoride which was diluted with diethyl ether in the ratio of 3 parts of the boron fluoride addition product to 1 part of the diethyl ether, was added portionwise to the reaction mixture at such a rate that the temperaure was mainained between —78° C. and —72° C. At the completion of the reaction, quenching was effected with concentrated aqueous ammonia and the mixture was thereupon warmed to room temperature. On drying, a rubbery, form-stable, slightly tacky solid was obtained.

Example 10

A diethyl ether-boron fluoride solution containing 20% diethyl ether was added dropwise to a mixture of 50 parts of vinyl isopropyl ether, 400 parts of liquefied propane, and 500 parts of powdered solid carbon dioxide. The reaction temperature was maintained at —78 to —75° C. by means of an outside cooling bath of solid carbon dioxide in ethanol. On quenching the reaction mixture with aqueous ammonia and drying, a slightly tacky, rubberlike solid was obtained. The polymer was dissolved in benzene and precipitated with methanol to produce a product free of catalyst residue and of quenching agent. Upon washing with fresh methanol and drying, a form-stable, spongy polymer was recovered.

Example 11

200 parts of vinyl isopropyl ether were added to 370 parts of solid carbon dioxide. A precooled 25% solution (by volume) of diethyl ether-boron fluoride in diethyl ether was added dropwise to the reaction mixture while stirring. The reaction temperature was —78 to —77° C. After completion of the reaction, unchanged monomer was separated from the polymer and recovered. The rubberlike polymer was quenched with aqueous ammonia and dried. It was dissolved in benzene and this solution was washed several times with water to remove the catalyst residue and quenching agent. The polymer was recovered by evaporation of the benzene, which may be reused in the process.

Example 12

100 parts of vinyl isopropyl ether, precooled to —78° C., were added dropwise with stirring to a mixture of 800 parts of liquefied propane and 3 milliliters of diethyl ether-boron fluoride maintained at the same temperature. After the polymerization was completed, the reaction mixture was quenched with 10 mls. of precooled 28% ammonium hydroxide and the resulting mixture warmed to room temperature. A rubberlike, form-stable product was thus obtained.

Example 13

800 mls. of gaseous boron trifluoride were passed into 750 parts of liquefied propane cooled externally by solid carbon dioxide to —75° C. 100 parts of vinyl isopropyl ether, precooled to —75° C., were slowly added portionwise to the mixture. After reaction was completed, the mixture was quenched, whereupon there was obtained a spongy, elastic, form-stable polymer.

Example 14

A solution of 50 parts of vinyl isopropyl ether and 250 parts of methylene chloride was cooled to —78° C. with solid carbon dioxide. Precooled diethyl ether-boron fluoride diluted with diethyl ether in the ratio of 2 parts of the boron fluoride complex to 1 part of the diethyl ether was added dropwise with stirring to effect the polymerization. The catalyst was inactivated with ammonium hydroxide. After warming to room temperature, methanol was added to precipitate the polymer from its methylene chloride solution and upon drying there was obtained a tenacious, rubbery, form-stable product.

Example 15

Diethyl ether-boron fluoride diluted in the ratio of 3:1 with ethyl ether was added dropwise to a solution of 50 parts of vinyl isopropyl ether and 50 parts of vinyl n-butyl ether in 500 parts of liquefied propane cooled to —78° C. The copolymer formed was treated with concentrated aqueous ammonia at the temperature of the reaction. On drying, a rubberlike, form-stable copolymer was obtained.

Example 16

50 parts of vinyl isopropyl ether and 200 parts of liquefied ethylene were added to a reaction vessel located in a cooling bath effective to maintain a reaction temperature of —100° C. Diluted ethyl ether-boron fluoride was added dropwise to the mixture while stirring to cause polymerization to ensue. A precooled aqueous ammonia-methanol solution was employed to quench the reaction mixture. The mixture was then warmed to room temperature and the polymer dried. An elastic, form-stable product was thereby obtained.

Example 17

Dibutyl ether-boron fluoride boiling at 61.9° C. at 10 mm. and diluted in the ratio of 2 parts to 1 with diethyl ether was added dropwise to a solution of 50 parts of vinyl isoproply ether and 250 parts of liquefied propane maintained at a reaction temperature of —45° C. with a cooling bath of solid carbon dioxide.

After the polymerization was completed, a solution of sodium hydroxide in methanol was added as a quenching agent and the mixture was warmed to room temperature. There was thus obtained a form-stable, granular polymer having an intrinsic viscosity of 5 (1% in benzene).

Example 18

The polymerization was carried out as in Example 5, except that in the place of solid carbon dioxide, a coil was fitted into the polymerization apparatus through which liquefied ethylene was circulated for the purpose of maintaining the reaction temperature desired and for effectively removing the heat of polymerization.

Example 19

The process was the same as in Example 5, except that instead of using solid carbon dioxide as the refrigerant, the heat of vaporization of the solvent was utilized for this purpose. A vacuum of 200 mm. was applied to the reaction mixture containing liquid propane as the solvent to maintain a temperature of —75° C. The propane which was recovered was condensed and recycled to the reaction.

Example 20

800 parts of liquefied propane were cooled by means of a liquid nitrogen bath to a temperature of −110° C., and 100 parts of vinyl isopropyl ether were added to the liquefied propane. 3 mols of a solutions of 1 part of diethyl ether-boron fluoride in 3 parts of diethyl ether were then added. At the prevailing temperature, no appreciable polymerization of the vinyl ether took place.

The reaction mixture was then allowed to warm to a temperature of −78° C., with vigorous agitation to cause polymerization to ensue. After the completion of the reaction, 10 mols of precooled 28% ammonium hydroxide were added as a quenching agent and the mixture warmed to room temperature. A very homogeneous, rubberlike, form-stable product was thus obtained.

Example 21

The procedure was the same as in Example 5, except that the diethyl ether-aluminum chloride complex was used in lieu of the diethyl ether-boron fluoride complex of Example 5.

Example 22

To 1100 parts of powdered solid carbon dioxide contained in an air-tight apparatus were added 750 parts of liquefied propane and 250 parts of precooled vinyl n-butyl ether. A cooling bath of ethanol and solid carbon dioxide was used to assist in maintaining the operating temperature, in this case −78° C. This mixture was stirred for about ½ hour to vent out all air, which was replaced by an atmosphere of carbon dioxide. Diethyl ether-boron fluoride, B. P. 56° C./25 mm., was added dropwise at such a rate that the temperature was maintained essentially at −78° C. Insoluble polymer began to precipitate and the catalyst was added until no monomer remained. This point may be determined by removing a sample of liquid, allowing it to warm up to evaporate the propane from the monomer, and adding to this some catalyst. If no polymerization is observed by heat evolution and charring, the test is conclusive of the fact that all the monomer has been polymerized.

Concentrated aqueous ammonia, cooled to below −50° C., was added as a quenching agent. On warming to room temperature and drying, a spongy, rubberlike, form-stable polymer was obtained. It exhibited elasticity, reverisble extensibility and high tensile strength. After storage at room temperature for as long as nine months, the product retained its granular form and its form stability. The intrinsic viscosity of this material was 11.0 (0.1% in benzene).

Example 23

The polymer was formed in the same manner and under the same conditions as in Example 22. However, the precipitated polymer was removed as formed by periodic interruption of the catalyst addition and by dipping out the solid material. The cold polymer was quenched with precooled ammonium hydroxide before warming and drying.

Example 24

The process was the same as in Example 22, except that the catalyst was precooled before its addition by causing it to flow through a chamber cooled by an alcohol-solid carbon dioxide mixture.

Example 25

Into a flask were placed 200 parts of liquid butane and 50 parts of vinyl n-butyl ether. The mixture was cooled to −78° C. by means of solid carbon dioxide and an external cooling bath. Precooled diethyl ether-boron fluoride was added portionwise at such a rate that the temperature was maintained between −77° and −78° C. At the completion of the reaction, quenching was effected with concentrated aqueous ammonia and the reaction mixture warmed to room temperature. On drying, a pressure-tacky, form-stable product, rubbery in nature, was obtained.

Example 26

To 325 parts of powdered solid carbon dioxide were added 200 parts of vinyl n-butyl ether. A precooled 25% solution (by volume) of diethyl ether-boron fluoride in diethyl ether was added dropwise with stirring. The reaction temperature was −76° to −77° C. After quenching with ammonia at this temperature and warming to room temperature, the mixture was dissolved in benzene and precipitated with methanol to produce a catalyst-free product. On washing with fresh methanol and drying, a form-stable, solid, rubberlike polymer was obtained.

Example 27

To a mixture of 600 parts of liquefied propane and 4 mols of diethyl ether-boron fluoride, maintained at −78° C. with the aid of solid carbon dioxide and an external cooling bath, were added dropwise with stirring, 200 parts of vinyl n-butyl ether precooled to −76° C. Then 20 mols of precooled 28% ammonium hydroxide were added and the contents warmed to room temperature where the polymer, free of propane and carbon dioxide, was dissolved in 100 parts of benzene. This solution was added to 2000 parts of rapidly stirred methanol. The precipitated polymer was separated, washed with 1000 parts of fresh methanol and dried to yield a catalyst-free, rubberlike product.

Example 28

The polymerization vessel was charged with 50 pounds of vinyl n-butyl ether and 200 pounds of liquefied propane. Solid carbon dioxide was added to the mixture throughout the reaction to maintain a temperature of −78° C. to −74° C. Diethyl ether-boron fluoride was added slowly to cause the polymerization to ensue.

At the completion of the catalyst addition, the mixture was warmed to −65° C. to remove most of the carbon dioxide. Then a sodium hydroxide solution was added to inactivate the catalyst. The vessel was closed and heated to about +5° C. The pressure rose to above 140 pounds per square inch. With stirring, 125 pounds of water were sprayed onto this warmed liquid propane solution of polymer. The stirring was stopped and the water layer was separated. This water washing operation was repeated until all acidic material was removed. The washed polymer solution was freed of its propane by venting or by cooling and then filtering the liquid propane from the insoluble polymer. The solvent may be reused in subsequent polymerizations.

The product was dried at 40° to 50° C. at a vacuum of 20 inches for twelve hours to remove all moisture. A rubberlike, resilient, tenacious, high molecular weight polymer was obtained.

Example 29

A solution of 50 parts of vinyl n-butyl ether and 50 parts of methylene chloride was cooled to −78° C. with the aid of solid carbon dioxide and an external cooling bath. Then at this temperature diethyl ether-boron fluoride was added dropwise with stirring to effect the polymerization. The catalyst was inactivated with concentrated aqueous ammonia used as a quenching agent. After warming to room temperature, methanol was added to precipitate the polymer from solution, and a tough, rubberlike product was obtained on drying.

Example 30

A solution of 100 parts of vinyl n-butyl ether and 100 parts of vinyl isobutyl ether in 800 parts of liquid propane was cooled to −78° C. by means of solid carbon dioxide and an external cooling bath. Dibutyl ether-boron fluoride, B. P. 61.9° C. at 10 mm., was added dropwise to the solution. The polymer formed was treated at the reaction temperature with concentrated aqueous ammonia as a quenching agent. On drying, a rubbery polymer was obtained.

*Example 31*

The polymerization was effected as in Example 22, except that instead of employing solid carbon dioxide as the cooling agent, the heat of vaporization of the solvent was utilized for this purpose. By applying a vacuum of 200 mm. to the reaction mixture, the temperature was maintained at −78° C. The propane which was removed was condensed and recycled.

*Example 32*

Gaseous boron trifluoride was passed into an agitated mixture of 40 parts of liquid ethylene and 10 parts of vinyl n-butyl ether, cooled to −80° C. and confined in a pressure vessel maintained at 34.5 pounds per square inch gauge pressure. The reaction temperature did not exceed −70° C. After completion of the polymerization, concentrated ammonium hydroxide was forced into the reaction mixture under pressure. The ethylene was then allowed to escape whereupon the pressure fell to atmospheric. A form-stable, rubberlike product was thus obtained.

*Example 33*

To a solution of 50 parts of vinyl n-butyl ether and 200 parts of liquefied propane, maintained at −101° C. with the aid of a liquid ethylene bath, was added slowly with vigorous stirring 2.5 mols of diethyl ether-boron fluoride. With continued agitation, the temperature of the reactants was raised to −75° C. where polymerization takes place as evidenced by precipitation of polymer. An alcohol-solid carbon dioxide bath surrounding the reactor is suitable for controlling the temperature at −75° C.

The contents of the flask were quenched with concentrated aqueous ammonia while maintaining said low temperature. The reaction mixture was then warmed to room temperature at which the product was washed with methanol and dried. There was thus obtained a form-stable, very homogeneous, rubberlike polymer.

*Example 34*

The process was the same as in Example 22, except that there was employed the aluminum chloride-diethyl ether complex in lieu of the boron fluoride-diethyl ether complex of Example 22.

Vinyl isobutyl ether has been polymerized at low temperatures to a rubberlike solid, such polymerization being described in U. S. Patent 2,061,934. The procedure in this patent, however, should not be confused or be considered analogous to the procedure described herein. Apparently the vinyl isobutyl ether has properties which distinguish it from the other monomers in this field. According to the patent, for example, it is stated that at the temperatures given therein, immediate polymerization ensues when the monomer is contacted with the catalyst. For instance, in Example 1, the polymerization, it is stated, "commences immediately and turbulently and is practically complete after a few seconds."

Polyvinyl isobutyl ether produced in this manner, however, does not yield an X-ray fiber diagram when stretched. As distinguished from the polymers of the vinyl ethers of the prior art, the polymers of this invention are microcrystalline and yield X-ray fiber diagrams when stretched. They are essentially produced by uniform and slow polymerization which is absolutely essential to obtain uniform rubberlike, form-stable polymers.

The polymers of my invention are in properties and appearance similar to rubber, being elastic, flexible and non-sticky, form-stable, high molecular weight solids. They may exhibit tack when brought into pressure contact with other surfaces. They may be worked on a mill for compounding purposes, cast from solution for laminating and coating purposes and for the production of transparent sheets, may be extruded or pressure molded, and employed as pressure adhesives and electrical insulators and for imparting strength and flexibility to waxes, paraffins and brittle plastic materials.

Variations and modifications of this invention will occur to persons skilled in the art and therefore I do not intend to be limited in the patent granted, except as required by the prior art and the appended claims.

I claim:

1. A form-stable, elastic, rubberlike polymer consisting of a polymerized vinyl lower alkyl ether, said polymer being microcrystalline and yielding X-ray fibre diagrams in stretched condition.

2. A form-stable, elastic, rubberlike polymer consisting of a polymerized vinyl alkyl ether in which the alkyl group contains 1 to 4 carbon atoms, said polymer being microcrystalline and yielding X-ray fibre diagrams in stretched condition.

3. A form-stable, elastic, rubberlike polymer consisting of polymerized vinyl methyl ether, said polymer being microcrystalline and yielding X-ray fibre diagrams in stretched condition.

4. A form-stable, elastic, rubberlike polymer consisting of polymerized vinyl isopropyl ether, said polymer being microcrystalline and yielding X-ray fiber diagrams in stretched condition.

5. A form-stable, elastic, rubberlike polymer consisting of polymerized vinyl n-butyl ether, said polymer being microcrystalline and yielding X-ray fibre diagrams in stretched condition.

References Cited in the file of this patent

UNITED STATES PATENTS

| Number | Name | Date |
|---|---|---|
| 2,061,934 | Mueller-Cunradi et al. | Nov. 24, 1936 |
| 2,429,587 | Schildknecht | Oct. 21, 1947 |
| 2,477,225 | Zoss | July 26, 1949 |
| 2,513,820 | Schildknecht | July 4, 1950 |
| 2,555,179 | Zoss | May 29, 1951 |
| 2,609,364 | Zoss | Sept. 2, 1952 |
| 2,616,879 | Zoss | Nov. 4, 1952 |